United States Patent Office 2,986,531
Patented May 30, 1961

2,986,531
POLYMERIZATION CATALYST
Ralph Courtenay Schreyer, Wilmington, Del., assignor to E. I. du Pont de Nemours and Company, Wilmington, Del., a corporation of Delaware
No Drawing. Filed Dec. 8, 1955, Ser. No. 551,746
12 Claims. (Cl. 252—429)

This invention relates to a novel polymerization catalyst and method for preparing same.

It has been reported heretofore that the reaction between titanium tetrachloride and lithium aluminum tetraalkyl or an aluminum trialkyl in an inert hydrocarbon medium produces an active catalyst for polymerization of ethylene (cf. U.S. Patent 2,721,189, issued October 18, 1955, to Anderson and Merckling; also Belgian Patent 533,632, dated May 16, 1955, and Australian patent application 751/54, of Ziegler). The present invention is directed to certain improvements whereby catalysts which produce polyethylene of relatively narrow distribution of molecular weights is obtained.

In accordance with the persent invention, it has been discovered that an effective polymerization catalyst is obtained by reacting a tetravalent titanium oxyhydrocarbon compound with a tetravalent titanium halide, whereby metathesis occurs, and subjecting the reaction product to reaction with a compound having aluminum attached to hydrocarbon.

Moreover, it has been discovered that a catalyst which is useful in the manufacture of polyethylene of improved molecular weight distribution is obtained by carrying out a reaction between an aluminum compound of the formula $AlR_nX_{(3-n)}$, X being halogen of the class consisting of chlorine and bromine, R being hydrocarbon, $n$ being a number from 1 to 3 inclusive, in an inert liquid medium with a tetravalent titanium compound having at least one but not more than three of the titanium valences satisfied by oxy groups attached to hydrocarbon (examples of this being —O alkyl, —O alkylene O—, —O aryl, —O cyclohexenylalkyl, etc.), the titanium valences not thus satisfied being satisfied by halogen of the class consisting of chlorine and bromine, whereby a mixture which is capable of polymerizing ethylene is obtained. Furthermore, in place of the compound of the formula $AlR_nX_{(3-n)}$, one may use a compound of the formula $LiAlR_4$, and it is advantageous to do so when the titanium compound has three halogens attached to titanium. The titanium compound which is subjected to reaction with the aluminum compound in the practice of this invention, can be made by interaction between tetravalent titanium halide (e.g. $TiX_4$, $TiX_3(O$ alkyl), or a mixture of tetrahalides) and tetravalent titanium compound capable of producing the desired reactant by metathesis, (e.g. $Ti(O$ alkyl$)_4$, $Ti(O$ alkyl$)_3X$, $Ti(O$ alkyl$)_2X_2$). The quantities of these components employed should correspond with the stoichiometric quantities called for by the metathesis in question. The direction of the metathesis is apparently always toward the production of compounds having the least halogen attached to any single titanium atom, i.e., the Ti—X bond is most reactive.

The titanium alkoxyhalides differ from each other in respect to solubility in hydrocarbons. It is desirable to take this into account in selecting the concentration of reactants to be employed. For any particular combination of reactants, it is desirable to use enough solvent to bring the reactants into solution. Solubility is also affected by the nature of the oxyhydrocarbon groups. For example, the lower members of the series (where the hydrocarbon groups are methyl or ethyl) are less soluble than the higher members where the hydrocarbon group contains at least 3 carbon atoms. Generally, however, there is no great advantage in having more than 10 carbon atoms per hydrocarbon group. This applies not only to the titanium compounds but to the lithium aluminum tetraalkyls, aluminum trialkyls and aluminum alkyl halides also.

The titanium alkoxyhalides are most conveniently obtained by reaction between $TiCl_4$ and $Ti(O$ alkyl$)_4$.

The reaction which takes place depends upon the ratio of the reactants as follows:

| No. of mols of $TiCl_4$ added per mol of $Ti(O$ alkyl$)_4$ | Reaction |
|---|---|
| 1:3 | $TiCl_4 + 3\ Ti(O$ alkyl$)_4 \longrightarrow 4\ TiCl(O$ alkyl$)_3$ |
| 1:1 | $TiCl_4 + Ti(O$ alkyl$)_4 \longrightarrow 2\ TiCl_2(O$ alkyl$)_2$ |
| 3:1 | $3TiCl_4 + Ti(O$ alkyl$)_4 \longrightarrow 4\ TiCl_3(O$ alkyl$)_3$ |

If desired, the titanium alkoxychloride can be isolated from the reaction mixture prior to the reaction with the aluminum compound, but this is not at all necessary. If such isolation of the titanium alkoxychloride is desired, it can be accomplished by distilling the reaction mixture. Thus, $TiCl_4$ (14 cc., 0.127 M) was added to 40 cc. $Ti(O$-isopropyl$)_4$ (0.134 M). The reaction was exothermic causing temperature to rise to 40° C. The mixture was distilled directly through an 18 inch Vigreaux column. No foreshot of $TiCl_4$ was obtained. Fifty-four grams of a product (B.P. 105°–106° C.) was collected. This became solid on cooling to 40°–50° C. The yield was 87%, not including hold-up and heel. Analysis gave the following results: Percent Ti, 17.1; Cl, 27.8; H, 5.95; C, 29.9 (calc. for $Ti(OC_3H_7)_2Cl_2$: Ti, 20.3; Cl, 30.0; H, 5.92; C, 30.4).

When $TiCl_3(O$ alkyl$)$ is desired, it is rather important to moderate the reaction by means of an inert diluent, in addition to using the theoretically required quantities of reactants.

Upon addition of lithium aluminum tetraalkyl, aluminum trialkyl or aluminum alkyl halide to the titanium alkoxy chloride (having one, two or three Cl's of the original tetrahalide substituted by alkoxy), the mixture generally becomes black and the aluminum compound is completely consumed by metathesis, or oxidation by the titanium compound. The chemical structure of the resulting mixture is not known, and the present invention is not dependent on any theory as to what molecular changes occur during the formation of the black solution. However, it would appear that the halide and alkoxy groups react with the aluminum-hydrocarbon linkages at different rates, or that the Ti-halide bonds react selectively leaving a catalyst of relatively uniform activity, as between the respective molecules thereof, and that this results in a polymer mixture having a relatively narrow molecular weight distribution. The products thus obtained are cold-drawable linear polyethylenes which are tougher and more tear-resistant than are linear polyethylenes having a broader molecular weight distribution.

It is to be understood that the expression "molecular weight" can be applied not only to pure materials (i.e. molecular weight is the weight in grams of $6.022 \times 10^{23}$ molecules), but also to polymeric materials which are mixtures. In the latter case, however, it is recognized that the distribution of molecular weight among all of the molecules present can vary so that the complete definition can only be provided by defining the number of molecules at each level of molecular weight. For practical purposes, however, the magnitude of the spread of the distribution of molecular weights can be indicated by the ratio between the two major averages, viz. the number average $\bar{M}_n$ (which is simply the weight in grams of $6.022 \times 10^{23}$ molecules), and the weight average $\bar{M}_w$. The meaning of $\bar{M}_w$ can be further explained by means of the following illustration. In a hypothetical case there may be, for example, $x$ different molecular sizes; there could be therefore $x$ different homogeneous fractions each having a specific molecular weight. The weights of these fractions would vary, but one of these fractions would be average in the sense that the weight of material in the fractions of lower molecular weight equals the weight of material in the fractions of higher molecular weight. This average is called the weight average molecular weight, $\bar{M}_w$. Stated another way, if the weight of each fraction is multiplied by the molecular weight of each fraction, and the sum of these products is divided by the total weights, the resulting quotient is $\bar{M}_w$. This can be determined approximately by fractionating the polymer into a number of molecular weight levels, determining molecular weight on each, and calculating $\bar{M}_w$ from the data thus obtained on the assumption that each fraction is homogeneous. The narrowing of the molecular weight distribution, as this terminology is used in the present specification, means lowering the $\bar{M}_w/\bar{M}_n$ ratio. In general, the larger the $\bar{M}_w/\bar{M}_n$ ratio, the larger is the spread in molecular weights.

One method for measuring the molecular weight distribution is to determine the steady state compliance by the method of F. Bueche, as described in J. of Appl. Physics, vol. 26, p. 738 (1955). This measurement depends upon the melt elasticity of the polymer, and gives values which vary inversely with increased spread of the sizes of the molecules. At any particular level of molecular weight (or melt index), the steady state compliance for linear polyethylene tends also to be an inverse measure of the toughness and strength of the polymer.

A desired range of melt index (extrudability) for linear polyethylene, in numerous applications is about 0.2 to 10.0, preferably 0.5 to 5.0. As is apparent from the following table, the alkoxychlorides are superior to titanium tetrachloride in respect to distribution at these desired levels of melt index. Ti(O alkyl)$_4$ requires a halogen-containing reducing agent, i.e. cannot be used with an aluminum alkyl in a halide-free system for ethylene polymerization, except under conditions which produce relatively low yields. Accordingly, the alkoxychlorides exhibit a kind of utility differing from that of either the tetrachloride or the tetra-alkoxide. It is noteworthy also that linear polyethylene which is made in solution, i.e. at a temperature above the melting point of the polymer, has a narrower molecular weight distribution than linear polyethylene prepared at temperatures low enough to produce a slurry, and that lithium aluminum alkyls are different from aluminum trialkyls in that the lithium aluminum alkyls are superior for making polymer of narrow molecular weight distribution. The data in the following table support this conclusion also. Thus, the table indicates conditions for making greatly improved polymer at the desired levels of melt index.

As can be seen from these results, the steady state compliance varies with temperature, and also with the reducing agent. Comparisons of the various titanium compounds must therefore take into account these other variables. When this is done, the data show an improvement in steady state compliance resulting from the use of titanium alkoxyhalide.

The method of preparing the catalyst of this invention is illustrated in the examples which follow. The temperature during reaction between the halide and alkoxide should be held down to below that which causes formation of titanate polymers, and preferably below 100° C. A suitable range is 20° to 100° C. Unless the reaction is performed in dilute solution, this formation of titanate polymers can be avoided only by efficient heat removal, since the methathesis is highly exothermic.

The mol ratio of titanium component to aluminum component in the catalyst can be varied as is known in the art, but generally should be from 0.4 to 1.4. The proportions should be such as to produce at least some divalent titanium, and there is evidence that maximum activity is attained at maximum content of divalent titanium.

The procedures employed in the practice of this invention are illustrated by the following examples.

EXAMPLE I

Into 200 cc. cyclohexane was place 1.5 cc. Ti(O-isopropyl)$_4$ and 0.55 cc. TiCl$_4$. Reaction took place immediately. To the resulting mixture was added 2.0 cc. diethyl aluminum bromide. This mixture was placed in a closed vessel and mixed with ethylene at 70° C. under a pressure of 1000 pounds per square inch. Reaction was rapid and temperature rose to 170° C. The polymerization was continued for one hour. The polyethylene thus produced was washed with methanol and dried, the dry weight of the product being 48 grams. Melt index was 0.03; density, 0.961; steady state compliance, 5.48; Newtonian viscosity, $5.09 \times 10^6$.

EXAMPLE II

Into 200 cc. cyclohexane was placed 1.25 millimols Ti(O-isopropyl)$_4$ and 3.75 millimols TiCl$_4$. Reaction took place immediately. To the resulting mixture was added 15 millimols of Al(n-heptyl)$_3$. The mixture was placed in a closed vessel and mixed with ethylene at 75° C. under a pressure of 1000 pounds. Reaction was rapid, and temperature rose to 200° C. The polymerization was continued for one hour. The polyethylene thus produced was washed with methanol and dried, the dry weight of the product being 47.2 grams. This polymer gave a "no flow" result in the melt index determination. It had a density of 0.955, a steady state compliance of 2.54, and a Newtonian viscosity of $1.10 \times 10^8$.

EXAMPLE III

Into 200 cc. cyclohexane was placed 1.25 millimols

TABLE

*Variation of steady state compliance with polymerization catalyst and conditions in ethylene polymerization*

| Catalyst System | Polymerization Temperature | Polymerization Pressure | Melt Index of Polymer (ASTM-D-1238-52-T) | Steady State Compliance of Polymer |
| --- | --- | --- | --- | --- |
| Titanium tetrachloride/aluminum triethyl | 150°–270° C. (above melting point of polymer). | 50–200 atm | 1.49 | 7.2 |
| Titanium tetrachloride/aluminum triisobutyl | do | 50–200 atm | 0.88 | 7.0 |
| Titanium tetrachloride/lithium aluminum tetradecyl | do | 50–200 atm | 1.0 | 4.4 |
| Ti(O-isopropyl)$_2$Cl$_2$/Et$_2$AlBr | 70°–170° C | 1,000 p.s.i. | 0.03 | 5.48 |
| Ti(O-isopropyl)Cl$_3$/aluminum triheptyl | 75°–200° C | 1,000 p.s.i. | 0.0 | 2.54 |
| Ti(O-isopropyl)Cl$_3$/Et$_2$AlBr | 75°–150° C | 1,000 p.s.i. | 0.347 | 10.8 |
| Titanium tetrachloride/aluminum triisobutyl | 0–100° C. (below melting point of polymer). | atmospheric pressure | 0.6 | 12.0 |
| Titanium tetrachloride/aluminum triethyl | do | do | 1.4 | 28.0 |
| Titanium tetrachloride/lithium aluminum tetradecyl | do | do | 1.16 | 15.9 | of Ti(O-isopropyl)$_4$ and 3.75 millimols of TiCl$_4$. Reaction took place immediately. To the resulting mixture was added 5 millimols of (ethyl)$_2$AlBr. The mixture was placed in a closed vessel and mixed with ethylene at 75° C. under a pressure of 1000 pounds per square inch of ethylene. Temperature rose to 150° C. The polymerization was continued for one hour. The polyethylene thus produced was washed with methanol, and dried, the dry weight of the product being 45.7 grams. This polymer had a melt index of 0.347, a density of 0.958, a steady state compliance of 10.8, and a Newtonian viscosity of $1.03 \times 10^6$.

EXAMPLE IV

A mixture of 10 millimols Ti(O-isopropyl)$_2$ Cl$_2$ and 10 millimols LiAl(n-decyl)$_4$ in 200 cc. cyclohexane was heated to 75° under an ethylene pressure of 700–1000 pounds per square inch for one hour. The resulting product was filtered, washed with methanol and dried. This gave 23 grams of no-flow linear polyethylene which was virtually free of low molecular weight components.

It is to be understood that the foregoing examples are illustrative only and that numerous other embodiments will occur to those who are skilled in the art. The ethylene polymerization can be performed at any suitable temperature, such as 50° C. to 300° C., under any suitable pressure, such as from 1 to 5000 atmospheres. It should be appreciated also that certain additional advantages, beyond the improvement in product quality, frequently are achieved through the practice of this invention. For instance, the polymerization rate compares very favorably with the rate which is reached under similar conditions using Ti(O alkyl)$_4$ with aluminum trialkyls. This was demonstrated in an experiment which was similar to Example II, except that in place of the Ti(O alkyl) Cl$_3$ which was produced from TiCl$_4$+Ti(O alkyl)$_4$ in that example, Ti(O alkyl)$_4$ was used without added TiCl$_4$. The yield of polymer was less than one gram. The alkoxyhalides are thus superior to the tetralkoxides with respect to rate, and superior to the tetrahalides with respect to molecular weight distribution.

I claim:

1. A polymerization catalyst composition, comprising the product obtained by reacting an aluminum compound of the class consisting of LiAlR$_4$ and compounds of the formula AlR$_n$X$_{(3-n)}$, X being halogen of the class consisting of chlorine and bromine, R being alkyl, $n$ being a number from 1 to 3 inclusive, in an alert liquid hydrocarbon medium, with a tetravalent titanium compound having at least one, but not more than three, of the titanium valences satisfied by oxy groups attached to alkyl, the titanium valences not thus satisfied being satisfied by halogen of the class consisting of chlorine and bromine, whereby the aluminum compound is completely consumed by methathesis and a mixture which is capable of polymerizing ethylene, is obtained.

2. The composition of claim 1 wherein said titanium compound is an alkoxychloride.

3. The composition of claim 2 wherein said titanium compound is TiCl$_2$(O alkyl)$_2$.

4. The composition of claim 2 wherein said titanium compound is TiCl$_3$(O alkyl).

5. The composition of claim 3 wherein the said aluminum compound is aluminum trialkyl.

6. The composition of claim 3 wherein the said aluminum compound is an aluminum alkyl bromide.

7. A process for preparing a polymerization catalyst which comprises reacting an aluminum compound of the class consisting of LiAlR$_4$ and compounds of the formula AlR$_n$X$_{(3-n)}$, X being halogen of the class consisting of chlorine and bromine, R being alkyl, $n$ being a number from 1 to 3 inclusive, in an inert liquid hydrocarbon medium, with a tetravalent titanium compound having at least one, but not more than three, of the titanium valences satisfied by oxy groups attached to alkyl, the titanium valences not thus satisfied being satisfied by halogen of the class consisting of chlorine and bromine, whereby the aluminum compound is completely consumed by metathesis and a mixture which is capable of polymerizing ethylene, is obtained.

8. The process of claim 7 wherein said titanium compound is produced by interaction between tetravalent titanium chloride and a tetravalent titanium alkoxide at a temperature of 20° to 100° C.

9. The process of claim 7 wherein the proportions of the tetravalent titanium halide and tetravalent titanium alkoxide are the quantities stoichiometrically corresponding to the formation of TiCl$_2$(O alkyl)$_2$.

10. The process of claim 7 wherein the proportions of the tetravalent titanium halide and tetravalent titanium alkoxide are the quantities stoichiometrically corresponding to the formation of TiCl$_3$(O alkyl).

11. A process for preparing a polymerization catalyst which comprises admixing titanium tetrachloride, with a titanium alkoxide having from 3 to 10 carbon atoms in its alkyl groups, in proportions stoichiometrically sufficient for the formation of TiCl$_3$(O alkyl), in an inert liquid hydrocarbon medium, at a temperature not in excess of 100° C., whereby a mixture comprising TiCl$_3$(O alkyl) is produced, introducing lithium aluminum tetraalkyl into the said mixture, the alkyl groups in the lithium aluminum tetraalkyl having from 3 to 10 carbon atoms, in such quantity that the Ti/Al mol ratio is within the range of from 0.4 to 1.4, whereby an ethylene polymerization catalyst composition is obtained which is capable of polymerizing ethylene, at a temperature high enough to produce linear ethylene polymer in solution, to a cold-drawable linear polyethylene having a narrower range of molecular weight distribution than is obtained under the polymerization conditions which are the same except for employing TiCl$_4$ instead of TiCl$_3$(O alkyl).

12. A process for preparing a polymerization catalyst suitable for converting ethylene to solid linear polyethylene which comprises reacting a tetravalent titanium oxyhydrocarbon compound with a tetravalent titanium halide wherein the halide radicals are of the class consisting of chloride and bromide, whereby metathesis occurs between halide and oxyhydrocarbon, and subjecting the reaction product to reaction with a compound having aluminum attached directly to hydrocarbon.

References Cited in the file of this patent

UNITED STATES PATENTS

| 2,481,273 | Young | Sept. 6, 1949 |
| 2,525,144 | Mavity | Oct. 10, 1950 |
| 2,721,189 | Anderson et al. | Oct. 18, 1955 |
| 2,824,145 | McCall | Feb. 18, 1958 |
| 2,846,426 | Larson et al. | Aug. 5, 1958 |

FOREIGN PATENTS

| 218,210 | Australia | Nov. 3, 1958 |
| 533,362 | Belgium | May 16, 1955 |

OTHER REFERENCES

"J. Organic Chemistry," vol. 10 of 1945, pages 505–515.